United States Patent [19]
Huhndorff et al.

[11] Patent Number: 5,173,371
[45] Date of Patent: Dec. 22, 1992

[54] BATTERY TO PREVENT CELL REVERSAL

[75] Inventors: Harry R. Huhndorff, Bay Village; Charles A. Roberts, Rocky River, both of Ohio

[73] Assignee: Eveready Battery Company, Inc., St. Louis, Mo.

[21] Appl. No.: 666,986

[22] Filed: Mar. 11, 1991

[51] Int. Cl.⁵ .................................................. H01M 2/30
[52] U.S. Cl. ........................................ 429/1; 429/157; 429/178
[58] Field of Search ............... 429/1, 157, 158, 163, 429/164, 167-170, 178, 66

[56] References Cited

U.S. PATENT DOCUMENTS

| | | | |
|---|---|---|---|
| 1,529,703 | 3/1925 | Jones | 429/1 |
| 2,544,115 | 3/1951 | Wagner | 429/167 |
| 3,480,481 | 11/1969 | Gauthier et al. | 136/111 |
| 3,676,221 | 7/1972 | Bach | 136/111 |
| 3,856,577 | 12/1974 | Oki et al. | 136/171 |
| 4,002,808 | 1/1977 | Fafa | 429/157 |
| 4,595,641 | 6/1986 | Giurtino | 429/1 |
| 4,871,628 | 10/1989 | Parker | 429/96 |

OTHER PUBLICATIONS

Two photographs of a D-size alkaline cell manufactured by Duracell and purchased in Europe.

Primary Examiner—Anthony Skapars
Attorney, Agent, or Firm—Robert W. Welsh

[57] ABSTRACT

Batteries of this invention prevent the flow of electrical current between a reversed cell and an adjacent cell aligned in an end-to-end configuration. Terminals useful with batteries of this invention are characterized by an electrically nonconductive portion cooperatively positioned above an electrically conductive portion. In one embodiment, the terminal's electrically nonconductive portion is masked with an electrically nonconductive resin.

23 Claims, 2 Drawing Sheets

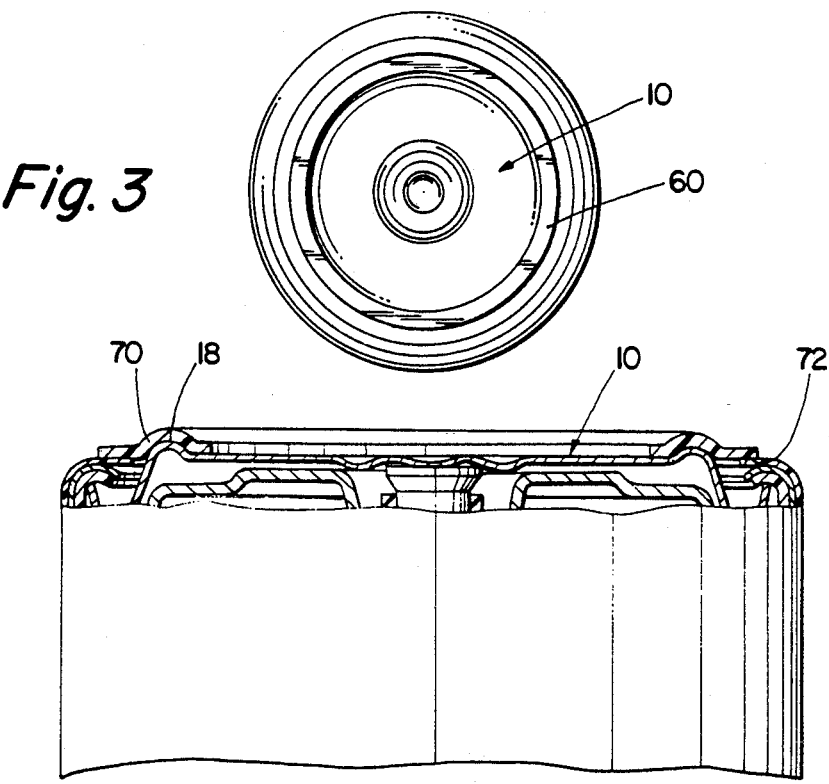
Fig. 3
Fig. 4
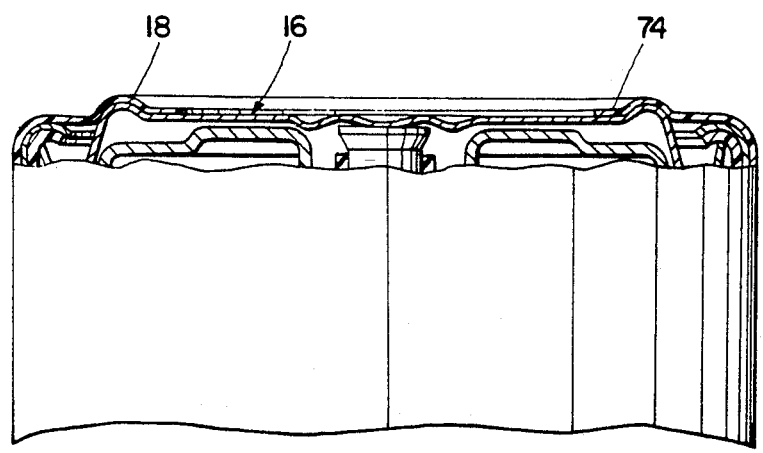
Fig. 5
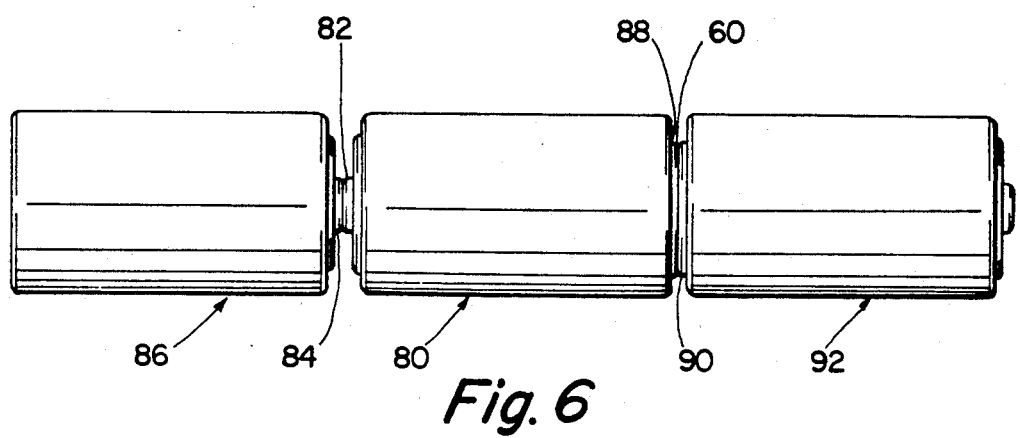
Fig. 6

BATTERY TO PREVENT CELL REVERSAL

FIELD OF THE INVENTION

The present invention pertains to electrochemical cells, and more particularly, to terminals that form a part of the cell and prevent the flow of electrical current between a reversed cell and an adjacent cell aligned in an end-to-end configuration.

BACKGROUND OF THE INVENTION

Conventional dry cells are usually tubular in shape with a positive terminal on one end and a negative terminal on the other end. When the cells are used in a multicell device, such as flashlights, radios and tape recorders, they are commonly aligned in an end-to-end configuration so that the positive terminal of one battery contacts the negative terminal of a second adjacent battery. While directions on how to properly insert cells into a device are usually provided by the device manufacturer, a small percentage of battery users inadvertently insert at least one of the cells into the device so that the electrical polarities of the cell's terminals are incorrectly reversed. In a device that uses two or more cells aligned end-to-end, a cell has been inserted in reverse when one of the cell's terminals contacts an identical terminal on an adjacent cell and the abutting terminals have the same electrical polarity. The primary danger associated with a reversed cell is that the properly oriented cells may charge the reversed cell when the device is turned on. Charging a cell leads to an increase in internal pressure due to the generation of hydrogen gas and may lead to activation of the cell's safety vent. Leakage of electrolyte through the ruptured safety vent is the net result. In addition, incorrect orientation of a cell in a device, commonly known as cell reversal, should be avoided because of the electrical damage that can be done to the device's electrical components when the cell's electrical current is forced backwards through the device's electrical circuit.

Insuring correct electrical orientation of a cylindrical cell's electrical terminals when the cell is inserted into a device that uses two or more cells aligned end-to-end is a problem that has been addressed numerous times. An examination of the prior art reveals that some of the proposed solutions to the cell reversal problem depend upon the reversed cell's terminal directly contacting one of the device's terminals. For example, U.S. Pat. No. 4,595,641 describes a battery compartment that uses an insulating member on the device's positive contact assembly to prevent electrical contact with the negative terminal of an improperly inserted cell while an insulating member on the device's negative contact assembly is used to prevent electrical contact with the positive terminal of an improperly inserted cell.

Another concept utilizes modifications to the device's terminal so that a device can accomodate a cell regardless of how the cell is inserted. U.S. Pat. No. 4,622,274 describes a terminal construction for an electric power supply. The terminal design is independent of the battery's orientation. Therefore, the battery can be switched end-to-end without affecting the contact between the battery and the mating circuit in the receiving device.

U.S. Pat. No. 4,002,808 describes the use of a mechanical link, such as a spring-catch system, screwing or locking, to provide for reliable mechanical and electrical linkage between cylindrical electrical cells that are connected in an end-to-end configuration.

JP 61-22566, a Japanese Kokai patent, discloses a cylindrical alkaline battery whose positive and negative terminals are recessed below the crimped over portions of the outer metal jacket.

U.S. Pat. No. 4,869,978 describes the use of an electrically insulating film to prevent an electrical short circuit between the positive electrode case and the bottom plate. In another embodiment, an electrically insulating film is positioned between the negative electrode terminal and the washer or between the gasket and the washer in order to prevent the formation of a local cell which could result in the leakage of electrolytic solution.

Cylindrical alkaline batteries made with the plastic label extended over a portion of the negative terminal are available as a commercial product. The centrally located and electrically conductive portion of the negative cover is recessed slightly below the insulating label which protects the terminal's circular edge.

The known methods of preventing cell reversal have met with limited success. However, none of the solutions known in the art prior to the subject invention were able to prevent the flow of electric current between adjacent cells when the reversed cell was made with conventional terminals and positioned between two cells in a device that uses three or more cells aligned end-to-end.

SUMMARY OF THE INVENTION

This invention relates to a pair of cylindrical electrochemical cells aligned end-to-end. The first cell has a cylindrical housing, a first terminal and a second terminal. The first terminal is secured to one end of the housing while the second terminal is secured to the opposite end of the housing. The terminals are electrically isolated from each other. The second cell has a cylindrical housing with a first terminal and a second terminal. The second cell's first terminal is secured to one end of the second cell's housing while the second cell's second terminal is secured to the opposite end of the second cell's housing. The second cell's terminals are electrically isolated from each other. The second cell's second terminal has an interior surface and an exterior surface which are located on opposite sides of the second cell's second terminal. The exterior surface of the second cell's second terminal comprises an electrically conducting portion and an electrically nonconducting portion. The electrically nonconducting portion extends above the electrically conductive portion. The second cell is cooperatively arranged with the first cell to abut the electrically nonconductive portion of the second cell's second terminal against the first cell's second terminal thereby preventing the flow of electrical current between the first cell and the second cell.

In another aspect, this invention relates to a pair of cylindrical electrochemical cells covered with electrically nonconductive labels and aligned end-to-end. The first cell has a cylindrical housing, a first terminal and a second terminal. The first terminal is secured to one end of the housing and the second terminal is secured to the opposite end of the housing. The terminals are electrically isolated from each other. The second cell has a cylindrical housing, a first terminal, a second terminal and a label. The first terminal is secured to one end of the second cell's housing and the second terminal is secured to the opposite end of the second cell's housing.

The second cell's terminals are electrically isolated from each other. The second cell's second terminal comprises an interior surface and an exterior surface which are located on opposite sides of the second cell's second terminal. The label is secured to the circumference of the second cell's cylindrical housing and extends over the end of the second cell's housing to which the second terminal is secured so that the label electrically insulates at least a portion of the exterior surface of the second cell's second terminal. The second cell is cooperatively arranged with the first cell to abut the electrically insulated portion of the second cell's second terminal against the first cell's second terminal thereby preventing the flow of electrical current between the first cell and the second cell.

In another aspect, this invention relates to an electrochemical cell including a cylindrical housing, a first terminal and a second terminal. The first terminal is secured to one end of the housing and the second terminal is secured to the opposite end of the housing. The first and second terminals are electrically isolated from each other. The second terminal has an interior surface and an exterior surface. The exterior surface is located on the opposite side of the second terminal from the interior surface. The exterior surface comprises an electrically conductive portion and an electrically nonconductive portion that extends above the conductive portion. Therefore, when the cell is inserted into a device so that the cell's electrical polarities are incorrectly oriented, the electrically nonconductive portion of the second terminal's exterior surface will prevent the flow of electrical current from the cell to the device or an adjacent cell.

In yet another aspect, this invention also relates to an electrochemical cell including a cylindrical housing, a first terminal, a second terminal and a label. The first terminal is secured to one end of the cell's housing and the second terminal is secured to the opposite end of the cell's housing. The second terminal has an interior surface and an exterior surface. The exterior surface is located on the second terminal opposite the interior surface. The cell's terminals are electrically isolated from each other. The label is secured to the circumference of the cell's housing and extends over the end of the housing to which the second terminal is secured so that the label electrically insulates at least a portion of the exterior surface of the second terminal. Therefore, when the cell is inserted into a device so that the cell's electrical polarities are incorrectly oriented, the electrically nonconductive portion of the second terminal's exterior surface will prevent the flow of electrical current from the cell to the device or an adjacent cell.

The subject invention specifically addresses the problem of preventing cell reversal in a device that uses three or more cells aligned in an end-to-end configuration and in which the reversed cell is positioned between the two end cells. While the subject invention prevents electrical contact between two cells if the reversed cell is located between a first adjacent cell and a second adjacent cell, all of which are tubular in shape and aligned end-to-end, the same invention may also prevent electrical contact between adjacent cells if the reversed cell is located on the end of a series of cells aligned end-to-end. In addition, the terminal of this invention may also prevent cell reversal in a device that uses a single cell.

BRIEF DESCRIPTION OF THE DRAWINGS

FIG. 3 is a plan view of a terminal that can be used with batteries of this invention.

FIG. 4 illustrates the use of a washer shaped insulator to provide protection against cell reversal.

FIG. 5 illustrates how a cell's label can be extended to electrically insulate a portion of the terminal's exterior surface.

FIG. 6 illustrates how cells of this invention fail to make electrical contact when one of the cells is reversed.

DETAILED DESCRIPTION OF THE INVENTION

Figure 1:
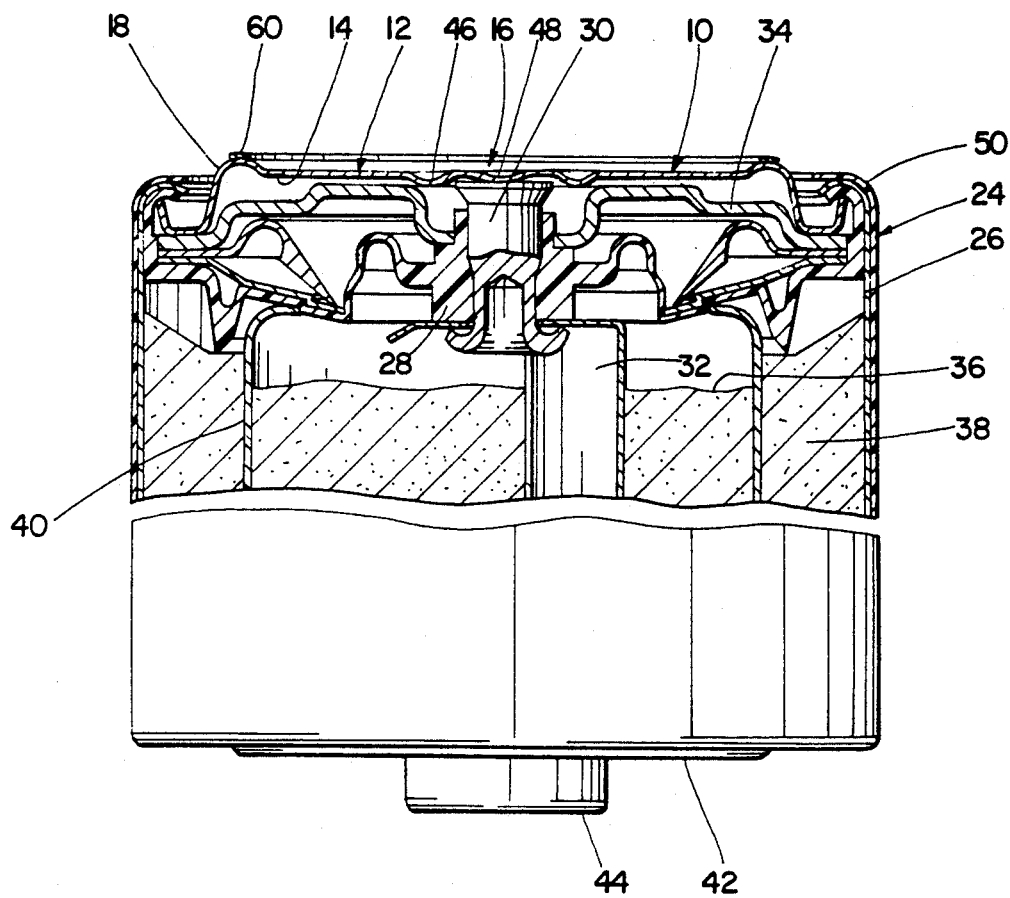
FIG. 1 is a cross section of a battery of this invention in which a portion of the negative terminal has been coated with an electrically nonconductive material.

Batteries of this invention utilize terminals that prevent the flow of electric current between adjacent cells, aligned end-to-end in a multicell device, when one of the cells is inserted so that its positive and negative terminals are reversed. Two or more cylindrical cells are defined to be aligned end-to-end when the terminal of one battery contacts the terminal of an adjacent battery and the longitudinal axes of the cells form a straight line. When properly inserted into a device that uses three or more cells, the positive terminal of the first cell abuts the negative terminal of the second cell and the positive terminal of the second cell abuts the negative terminal of the third cell. When one of the cells is inserted in reverse, the terminal of one cell abuts an identical terminal on an adjacent cell and the abutting terminals have the same electrical polarity.

On terminals that are useful with batteries of this invention, the terminal's exterior surface should contain at least one electrically conductive portion and at least one electrically nonconductive portion. Preferably, a majority of the terminal's exterior surface will be electrically conductive so that a properly oriented and adjacent battery will have sufficient opportunity to contact the terminal's conductive portion. The terminal's conductive portion is defined to be that part of the terminal's exterior surface that is not masked with an electrically nonconductive material. The electrically nonconductive portion of the terminal, which is permanently secured to and covers only a minor amount of the terminal's exterior surface, is defined to be that part of the terminal's exterior surface that is masked by an electrically nonconductive material. The phrase "permanently secured" means that the nonconducting surface cannot be easily removed by the consumer and therefore will remain attached to the terminal during normal handling and use of the battery. The nonconductive portion may be made from any configuration of electrically nonconductive material that prevents undesirable electrical contact with an adjacent cell. Suitable configurations of electrically nonconductive material include: a continuous circle; a series of dots placed close together to form a circle; three dots spaced equally about a circle; or one strip placed appropriately across the exterior surface of the terminal. The conductive portion and the nonconductive portion are cooperatively arranged so that the nonconductive portion extends above the conductive portion. In this context, the nonconductive portion is defined to extend above the conductive portion if only the nonconductive portion can contact a flat plate that has been placed parallel to and in contact with the terminal's exterior surface. The flat plate should be selected so that its surface area is greater than the terminal's surface area.

The terminal's exterior surface may be contoured to create at least one upper region and at least one lower region. The contours may be formed by creating convex or concave impressions in the surface of the terminal. The upper region is that section of the terminal's exterior surface that protrudes above a lower region of the terminal's exterior surface. In one embodiment, the upper region may be the top of a convex impression that extends upwardly from the terminal's exterior surface. In another embodiment, the upper region is the essentially flat section of the terminal's exterior surface that exists above a concave impression in the terminal's exterior surface. If the terminal has an upper region and a lower region, then at least a part of the upper region must be masked with an electrically nonconductive material and at least a part of the lower region must not be masked with an electrically nonconductive material so that the lower region remains electrically conductive. Preferably, the central area of the terminal's exterior surface is electrically conductive and forms a part of the lower region while the electrically nonconductive portion forms a part of the upper region and surrounds the conductive lower region.

A preferred electrically nonconductive material for use on a terminal incorporated into a battery of this invention is a resin that has been cured with ultraviolet light and/or heat. One example of a suitable material is ENVIBAR XO281R made by Union Carbide of Danbury, Conn. A second example of a suitable material is manufactured by Loctite Corporation of Newington, Conn. and is identified as FMD 207B. A third material, identified as E91-31, is produced by PPG Industries of Pittsburgh, Pa. The critical characteristic of the material applied to the terminal is not the chemical composition. Instead, the required material properties are (1) electrically nonconductive and (2) capable of being securely attached to the surface of the terminal. In addition to resins that can be cured with ultraviolet light and/or heat, other suitable insulating materials include tape, paints and hot melt adhesives. Any tape that has an adhesive on one side and is electrically nonconductive can be used. For example, suitable tapes can be made from thin strips of polyvinyl chloride that has been coated on one side with an adhesive.

Terminals that are suitable for use in batteries of this invention can be made by roll coating the electrically nonconducting material onto the terminal's exterior surface so that the electrically nonconductive material is applied to only the exterior surface of the terminal's upper region. The coated terminal is then exposed to ultraviolet light and/or heat for a sufficient period of time to cure the resin. Typical curing times can vary from twenty seconds to one minute depending on the resin used.

A preferred embodiment of this invention is shown in FIG. 1. In this drawing, the terminal's exterior surface 12 is facing upward while the terminal's interior surface 14 is facing downward. The central area 16 of terminal 10 is slightly recessed below the circular ridge 18 that serves as the terminal's upper region. The exterior surface 12 of the circular ridge 18 has been coated with an electrically nonconductive material 60 that is permanently secured to the terminal. The central area 16 of the terminal's exterior surface is not coated with the nonconductive material. The thickness of the insulating material is approximately 2 thousandths of an inch. The internal components of the galvanic cell are contained within a sealed cylindrical housing 24. The housing is a metallic cup shaped container 26 that is open at one end and closed at the other end. The open end of the housing is sealed by a seal assembly that includes a nylon seal 28, a brass rivet 30, a brass current collector 32 and a neutral cover 34. The nylon washer 28 electrically insulates the metallic container 26 from the brass rivet 30. The current collector 32 is secured to the seal 28 by rivet 30. Contained within the housing are: an anode 36, a cathode 38, separator 40 and electrolyte (not shown) which are arranged to produce an electric current. Current collector 32 contacts anode 36. Attached to the closed end of housing 24 is terminal 42. Terminal 42 is made from tin plated steel or nickel plated steel. Projection welds are used to secure terminal 42 to container 26. Extending from the center of terminal 42 is protrusion 44. The entire exterior surface of terminal 42 is electrically conductive. Terminal 42 is electrically connected to the cell's cathode so that terminal 42 serves as the galvanic cell's positive terminal. Terminal 10 is secured to the end of housing 24 opposite terminal 42. Terminals 10 and 42 are electrically isolated from each other. The contour of terminal 10 is characterized by concentric protrusion 18 and recesses 46 and 48 that extend a short distance from the essentially planar surface of terminal 10. The concentric impressions 18, 46 and 48 improve the terminal's flexural strength and help to insure contact between the terminal 10 and rivet 30. Terminal 10 is electrically connected to the cell's anode so that terminal 10 serves as the galvanic cell's negative terminal. The upper region of terminal 10 is the top surface of concentric ring 18. The highest surface of ring 18 extends above the top of the galvanic cell's sidewall 50. Conventionally, at least a part of terminal 10 is made to extend beyond the galvanic cell's sidewall 50 so that terminal 10 can directly abut a device's electrical contact (not shown).

Figure 2:
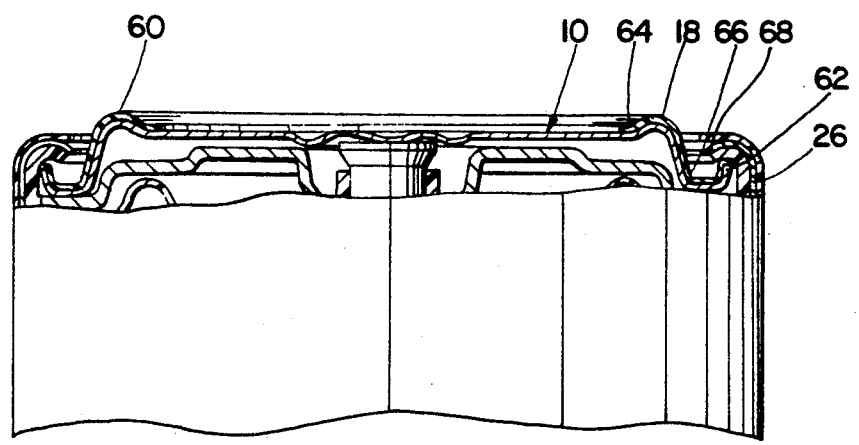
FIG. 2 is a cross section of a battery of this invention in which the circumferential portion of the negative terminal's exterior surface has been coated with an electrically nonconductive material.

As shown in FIG. 2, the application of a continuous coating of electrically insulating material 60 from the edge 62 of terminal 10 inwardly to a point 64 just inside the terminal's upper region 18 is also contemplated. Terminals made with an electrically insulating material between the edge 62 of terminal 10 and extending to a point inside the terminal's upper region 18 would eliminate the possibilities of (1) cell reversal as previously described and (2) the formation of an electrical short circuit between the circumferential portion 66 of terminal 10 and the inwardly crimped portion 68 of the metallic cup shaped container 26.

FIG. 3 is a plan view of terminal 10. The electrically insulating material 60 has been applied to the top of the terminal's upper region 18 thereby forming a circle of insulation.

As shown in FIG. 4, a third embodiment of this invention utilizes a washer shaped piece of electrically insulating material 70. This material is configured to cover the exterior surface of the terminal's upper region 18. An adhesive 72 applied to one side of the washer is used to permanently secure washer 70 to terminal 10.

As shown in FIG. 5, a third embodiment of this invention uses the cell's plastic label 74 to electrically insulate the exterior surface of the terminal's upper region 18. This embodiment requires that the battery be labelled with a thin plastic film that is electrically nonconductive. Suitable labels for batteries are described in U.S. Pat. No. 4,911,994. By extending the label over the exterior surface of the terminal's upper region, the terminal's electrically conductive central area 16 is recessed below the electrically nonconductive label 74. Electrical contact between the terminal's central area and an adjacent cell can only be achieved if the adjacent cell is capable of extending into the recessed terminal's central area and contacting the recessed terminal's electrically conducting surface.

Three cylindrical galvanic cells, aligned end-to-end, are shown in FIG. 6. The middle cell 80 has been reversed so that positive terminal 82 of cell 80 contacts positive terminal 84 of cell 86 while negative terminal 88 of cell 80 abuts negative terminal 90 of cell 92. Negative terminals 88 and 90 are not capable of conducting an electric current between batteries 80 and 92 because electrically nonconducting material 60 has been applied to the upper region of terminal 88 and the upper region of terminal 90.

Terminals useful in batteries of this invention may be prepared in the following manner. First, place the terminals on a conveyor belt so that the exterior surface of each terminal faces upward. The belt can then carry the terminals beneath a roll coating apparatus which is designed to apply a thin coating of ENVIBAR X0281R resin to just the terminal's upper region. The terminals may then be transported by the conveyor belt into a curing oven that is equipped with ultraviolet lights. The American Ultraviolet Company of Murray Hill, N.J. manufactures a suitable curing oven. The speed of the conveyor belt and the ultraviolet lights should be selected so that each terminal is exposed to 300 watts per inch of ultraviolet light for approximately 40 seconds. As the terminals exit the curing oven, the resin will be electrically nonconductive and securely attached to the surface of the terminals.

Terminals on batteries of the present invention are not limited by specific shape, contours, physical dimensions, or the illustrative examples provided above. While this invention has been described with reference to particular details, it is not intended that these details shall be construed as limiting the scope of this invention.

We claim:

1. A pair of electrochemical cells, including:
   (a) a first electrochemical cell having a cylindrical housing, a first terminal secured to one end of said housing, a second terminal secured to the end of said housing opposite said first terminal and electrically isolated from said first terminal; and
   (b) a second electrochemical cell having a cylindrical housing, a first terminal secured to one end of said housing, a second terminal secured to the end of said housing opposite said second cell's first terminal and electrically isolated from said second cell's first terminal, said second cell's second terminal having an interior surface and an exterior surface, the exterior surface located on said second cell's second terminal opposite the interior surface, wherein the exterior surface of said second cell's second terminal is contoured with convex impressions which are masked with an electrically nonconductive material thereby creating an electrically nonconductive upper region and an electrically conductive lower region, the upper region protruding above the lower region, said second electrochemical cell cooperatively arranged to abut said electrically nonconductive upper region of said second cell's second terminal against said first cell's second terminal thereby preventing the flow of electrical current between said first cell and said second cell.

2. A pair of electrochemical cells, as recited in claim 1, wherein said first cell's second terminal and said second cell's second terminal have the same electrical polarity.

3. A pair of electrochemical cells, as recited in claim 1, wherein the electrically nonconductive material is permanently secured to the exterior surface of said second cell's second terminal.

4. A pair of electrochemical cells, as recited in claim 1, wherein said first cell's second terminal has an interior surface and an exterior surface, wherein the exterior surface on said first cell's second terminal is contoured with convex impressions and masked with an electrically nonconductive material thereby creating an electrically nonconductive upper region and an electrically conductive lower region, the upper region protuding above the lower region, said second cell cooperatively arranged with said first cell to abut the electrically nonconductive upper region of said first cell's second terminal against the electrically nonconductive upper region of said second cell's second terminal thereby preventing the flow of electrical current between said first cell and said second cell.

5. A pair of electrochemical cells, as recited in claim 4, wherein said electrically nonconductive material on the upper region is permanently secured to the exterior surface of said second cell's second terminal.

6. A pair of electrochemical cells, as recited in claim 1, wherein the electrically nonconductive surface of said second cell's second terminal covers only a minor amount of the exterior surface of said second cell's second terminal.

7. A pair of electrochemial cells, as recited in claim 1, wherein the electrically conductive surface is centrally located on the exterior surface of said second cell's second terminal.

8. A pair of electrochemical cells, as recited in claim 1, wherein the exterior surface of said second cell's second terminal is contoured to comprise an electrically conductive and centrally located lower region and an electrically nonconductive upper region which surrounds the lower region.

9. A pair of electrochemical cells, as recited in claim 1, wherein the electrically nonconducting upper region is masked with a resin.

10. A pair of electrochemical cells, as recited in claim 9, wherein said resin is cured with ultraviolet light.

11. A pair of electrochemical cells, as recited in claim 1, wherein the electrically nonconductive upper region is masked with a tape.

12. A pair of electrochemical cells, as recited in claim 11, wherein said tape is shaped like a washer.

13. A pair of electrochemical cells, including:
   (a) a first electrochemical cell having a cylindrical housing, a first terminal secured to one end of said housing, a second terminal secured to the end of said housing opposite said first terminal and electrically isolated from said first terminal, said second terminal has an interior surface and exterior surface, the exterior surface located on said second terminal opposite the interior surface, wherein the exterior surface of said first cell's second terminal is contoured with convex impressions thereby creating an upper region and a lower region, the upper region protrudes above the lower region; and (b) a second electrochemical cell having, a cylindrical housing, a first terminal secured to one end of said housing, a second terminal secured to the end of said housing opposite said first terminal and electrically isolated from said first terminal, said second terminal has an interior surface and an exterior surface which are located on opposite sides of said second cell's second terminal, wherein the exterior surface of said second cell's second terminal is contoured with convex impressions thereby creating an upper region, the upper region protrudes above the lower region, a label, secured to the circumference of said second cell's cylindrical housing, extends over the end of said second cell's housing to which the second terminal is secured so that said label electrically insulates the upper region of said second cell's second terminal, said second cell cooperatively arranged with said first cell to abut said electrically insulated upper region of said second cell's second terminal against said first cell's second terminal thereby preventing the flow of electrical current between said first cell and said second cell.

14. A pair of electrochemical cells, as recited in claim 13, wherein said first cell further comprises a label, secured to the circumference of said first cell's cylindrical housing and extending over the end of said first cell's housing to which the first cell's second terminal is secured so that said label electrically insulates the upper region of said exterior surface of said first cell's second terminal, said second cell cooperatively arranged with said first cell to abut the electrically insulated upper region of said second cell's second terminal against the electrically insulated upper region of said first cell's second terminal thereby preventing the flow of electrical current between said first cell and said second cell.

15. A pair of electrochemical cells, as recited in claim 13, wherein said first cell's second terminal and said second cell's second terminal have the same electrical polarity.

16. An electrochemical cell, including:
(a) a housing;
(b) a first terminal secured to one end of said housing; and
(c) a second terminal, secured to the end of said housing opposite said first terminal and electrically isolated from said first terminal, said second terminal having an interior surface and an exterior surface, wherein the exterior surface is contoured with convex impressions and masked with an electrically nonconductive material thereby creating an electrically nonconductive upper region and an electrically conductive lower region positioned so that the electrically nonconductive upper region extends above the electrically conductive lower region.

17. An electrochemical cell as recited in claim 16, wherein the electrically nonconductive material is permanently secured to the exterior surface of said second terminal.

18. An electrochemical cell as recited in claim 16, wherein the electrically nonconductive upper region is masked with a resin.

19. An electrochemical cell, as recited in claim 18, wherein the resin is cured with ultraviolet light.

20. An electrochemical cell, as recited in claim 16, wherein the electrically nonconductive upper region is masked with a tape.

21. An electrochemical cell, as recited in claim 20, wherein said tape is shaped like a washer.

22. An electrochemical cell, including:
(a) a cylindrical housing;
(b) a first terminal secured to one end of said housing;
(c) a second terminal, secured to the end of said housing opposite said first terminal and electrically isolated from said first terminal, said second terminal has an interior surface and an exterior surface, wherein the exterior surface, located on said second terminal opposite the interior surface is contoured with convex impressions thereby creating an upper region and a lower region; and
(d) a label, secured to the circumference of said housing extends over the end of said housing to which the second terminal is secured so that said label electrically insulates at least a portion of the upper region of said second terminal.

23. A pair of electrochemical cells, including;
(a) a first electrochemical cell having a cylindrical housing, a first terminal secured to one end of said housing, a second terminal secured to the end of said housing opposite said first terminal and electrically isolated from said first terminal; and
(b) a second electrochemical cell having a cylindrical housing, a first terminal secured to one end of said housing, a second terminal secured to the end of said housing opposite said second cell's first terminal and electrically isolated from said second cell's first terminal, said second cell's second terminal having an interior surface and an exterior surface, wherein the exterior surface is contoured with convex impressions and masked with an electrically nonconductive material to comprise an electrically conductive and centrally located lower region and an electrically nonconductive upper region which surrounds and extends above the lower region, the upper region covers a minor amount of said second cell's exterior surface, said second electrochemical cell cooperatively arranged to abut the electrically nonconductive upper region of said second cell's second terminal against said first cell's second terminal thereby preventing the flow of electrical current between said first cell and said second cell.

* * * * *